United States Patent
Kreidieh et al.

(10) Patent No.: US 12,195,035 B2
(45) Date of Patent: Jan. 14, 2025

(54) GENERATION AND TRANSMISSION OF CONTROL COMMANDS FOR CONNECTED VEHICLES BASED ON PREDICTED FUTURE FLOW, AVERAGE VELOCITY, OR FUTURE DENSITY OF TRAFFIC

(71) Applicant: Nissan North America, Inc., Franklin, TN (US)

(72) Inventors: Abdul Rahman Kreidieh, Oakland, CA (US); Fang-Chieh Chou, Sunnyvale, CA (US); Viju James, Fremont, CA (US); Najamuddin Mirza Baig, San Jose, CA (US); Liam Pedersen, San Francisco, CA (US)

(73) Assignee: Nissan North America, Inc., Franklin, TN (US)

( * ) Notice: Subject to any disclaimer, the term of this patent is extended or adjusted under 35 U.S.C. 154(b) by 386 days.

(21) Appl. No.: 17/707,325

(22) Filed: Mar. 29, 2022

(65) Prior Publication Data

US 2023/0311928 A1 Oct. 5, 2023

(51) Int. Cl.
- *B60W 50/00* (2006.01)
- *B60W 40/105* (2012.01)
- *B60W 60/00* (2020.01)
- *G07C 5/00* (2006.01)

(52) U.S. Cl.
CPC ........ *B60W 60/001* (2020.02); *B60W 40/105* (2013.01); *G07C 5/008* (2013.01); *B60W 2552/53* (2020.02); *B60W 2554/4045* (2020.02)

(58) Field of Classification Search
CPC ............ B60W 60/001; B60W 40/105; B60W 2552/53; B60W 2554/4045; G07C 5/008
USPC .......................................................... 701/23
See application file for complete search history.

(56) References Cited

U.S. PATENT DOCUMENTS

| | | | |
|---|---|---|---|
| 7,096,115 B1* | 8/2006 | Groth | G08G 1/092 340/905 |
| 8,112,219 B2* | 2/2012 | Johnson | G08G 1/20 701/410 |
| 10,235,882 B1* | 3/2019 | Aoude | G08G 1/096725 |
| 10,928,521 B2* | 2/2021 | Zhao | G08G 1/096816 |
| 11,080,997 B2* | 8/2021 | Yamada | B60T 7/12 |

(Continued)

OTHER PUBLICATIONS

Correction Factor Safeopedia Definition; May 14, 2019; 9 pages; https://www.safeopedia.com/definition/5661/correction-factor.

(Continued)

*Primary Examiner* — Richard A Goldman
(74) *Attorney, Agent, or Firm* — Young Basile Hanlon & MacFarlane, P.C.

(57) ABSTRACT

A server accesses vehicle data from each connected vehicle (CV) of a subset of a plurality of CVs on a roadway portion, the vehicle data comprising at least one of: a position, a velocity, or a headway. The server generates, based on the accessed vehicle data, a long-term shared world model. The server generates, using the long-term shared world model, a data structure representing predicted future velocities on the roadway portion by position and time by applying a traffic flow model to the long-term shared world model. The server transmits, to a connected autonomous vehicle (CAV), a control signal for controlling operation of the CAV based on the generated data structure.

20 Claims, 11 Drawing Sheets

(56) References Cited

U.S. PATENT DOCUMENTS

| | | | |
|---|---|---|---|
| 2010/0049428 A1* | 2/2010 | Murata | G09B 29/007 |
| | | | 701/533 |
| 2013/0275033 A1* | 10/2013 | Bastiaensen | G01C 21/26 |
| | | | 701/119 |
| 2013/0282264 A1* | 10/2013 | Bastiaensen | G08G 1/0145 |
| | | | 701/119 |
| 2015/0170514 A1* | 6/2015 | Stenneth | G08G 1/0125 |
| | | | 701/117 |
| 2017/0243121 A1* | 8/2017 | Lai | G08G 1/0129 |
| 2018/0063261 A1* | 3/2018 | Moghe | H04W 36/0083 |
| 2019/0311616 A1 | 10/2019 | Jin et al. | |
| 2020/0364953 A1 | 11/2020 | Simoudis | |
| 2020/0386569 A1* | 12/2020 | Stajner | G08G 1/096844 |
| 2021/0012651 A1* | 1/2021 | Park | G08G 1/0129 |
| 2021/0065551 A1* | 3/2021 | Manohar | G08G 1/04 |
| 2021/0118294 A1* | 4/2021 | Ran | G08G 1/167 |
| 2021/0295705 A1* | 9/2021 | Yang | G01C 21/3407 |
| 2021/0319691 A1* | 10/2021 | Merwaday | G08G 1/04 |
| 2022/0198937 A1* | 6/2022 | Meri?li | G05D 1/69 |
| 2023/0024838 A1* | 1/2023 | Kim | G08G 1/0112 |
| 2023/0311928 A1* | 10/2023 | Kreidieh | G08G 1/0141 |
| | | | 701/23 |
| 2023/0316908 A1* | 10/2023 | Kreidieh | B60W 60/001 |
| | | | 701/1 |
| 2023/0316909 A1* | 10/2023 | Chou | G08G 1/0112 |
| | | | 701/1 |

OTHER PUBLICATIONS

Correction factor Wiktionary Definition; Dec. 3, 2019; 1 page; https://en.wiktionary.org/wiki/correction_factor.

* cited by examiner

GENERATION AND TRANSMISSION OF CONTROL COMMANDS FOR CONNECTED VEHICLES BASED ON PREDICTED FUTURE FLOW, AVERAGE VELOCITY, OR FUTURE DENSITY OF TRAFFIC

TECHNICAL FIELD

This disclosure relates generally to connected vehicles and connected automated vehicles, and more particularly to generating and using a long-term shared world model of a roadway for operation of connected automated vehicles.

BACKGROUND

Traffic congestion has a high cost, for example, in lost person-hours, excess carbon emissions, and increased likelihood of vehicle accidents. The proportion of vehicles on a roadway that are connected vehicles (CVs), capable of transmitting data to over a network, and connected automated vehicles (CAVs), capable of transmitting data over the network and receiving control signals over the network, is increasing.

SUMMARY

Disclosed herein are aspects, features, elements, implementations, and embodiments using belief state determination for real-time decision-making while a vehicle is traveling through a vehicle transportation network.

An aspect of the disclosed embodiments is a method for generating and transmitting a control signal to a vehicle. The method includes accessing vehicle data from each connected vehicle (CV) of a subset of a plurality of CVs on a roadway portion, the vehicle data comprising at least one of: a position, a velocity, or a headway. The method includes generating, based on the accessed vehicle data, a long-term shared world model. The method includes generating, using the long-term shared world model, a data structure representing predicted future velocities on the roadway portion by position and time by applying a traffic flow model to the long-term shared world model. The method includes transmitting, to a connected autonomous vehicle (CAV), a control signal for controlling operation of the CAV based on the generated data structure.

An aspect of the disclosed embodiments is an apparatus for generating and transmitting a control signal to a vehicle. The apparatus incudes a processor and a memory. The memory stores instructions. The processor executes the instructions to access vehicle data from each connected vehicle (CV) of a subset of a plurality of CVs on a roadway portion, the vehicle data comprising at least one of: a position, a velocity, or a headway. The processor executes the instructions to generate, based on the accessed vehicle data, a long-term shared world model. The processor executes the instructions to generate, using the long-term shared world model, a data structure representing predicted future velocities on the roadway portion by position and time by applying a traffic flow model to the long-term shared world model. The processor executes the instructions to transmit, to a connected autonomous vehicle (CAV), a control signal for controlling operation of the CAV based on the generated data structure.

An aspect of the disclosed embodiments is a computer-readable medium for generating and transmitting a control signal to a vehicle. The computer-readable medium stores instructions. The instructions include code to access vehicle data from each connected vehicle (CV) of a subset of a plurality of CVs on a roadway portion, the vehicle data comprising at least one of: a position, a velocity, or a headway. The instructions include code to generate, based on the accessed vehicle data, a long-term shared world model. The instructions include code to generate, using the long-term shared world model, a data structure representing predicted future velocities on the roadway portion by position and time by applying a traffic flow model to the long-term shared world model. The instructions include code to transmit, to a connected autonomous vehicle (CAV), a control signal for controlling operation of the CAV based on the generated data structure.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects disclosed herein will become more apparent by referring to the examples provided in the following description and drawings in which like reference numbers refer to like elements.

DETAILED DESCRIPTION

Figure 1:
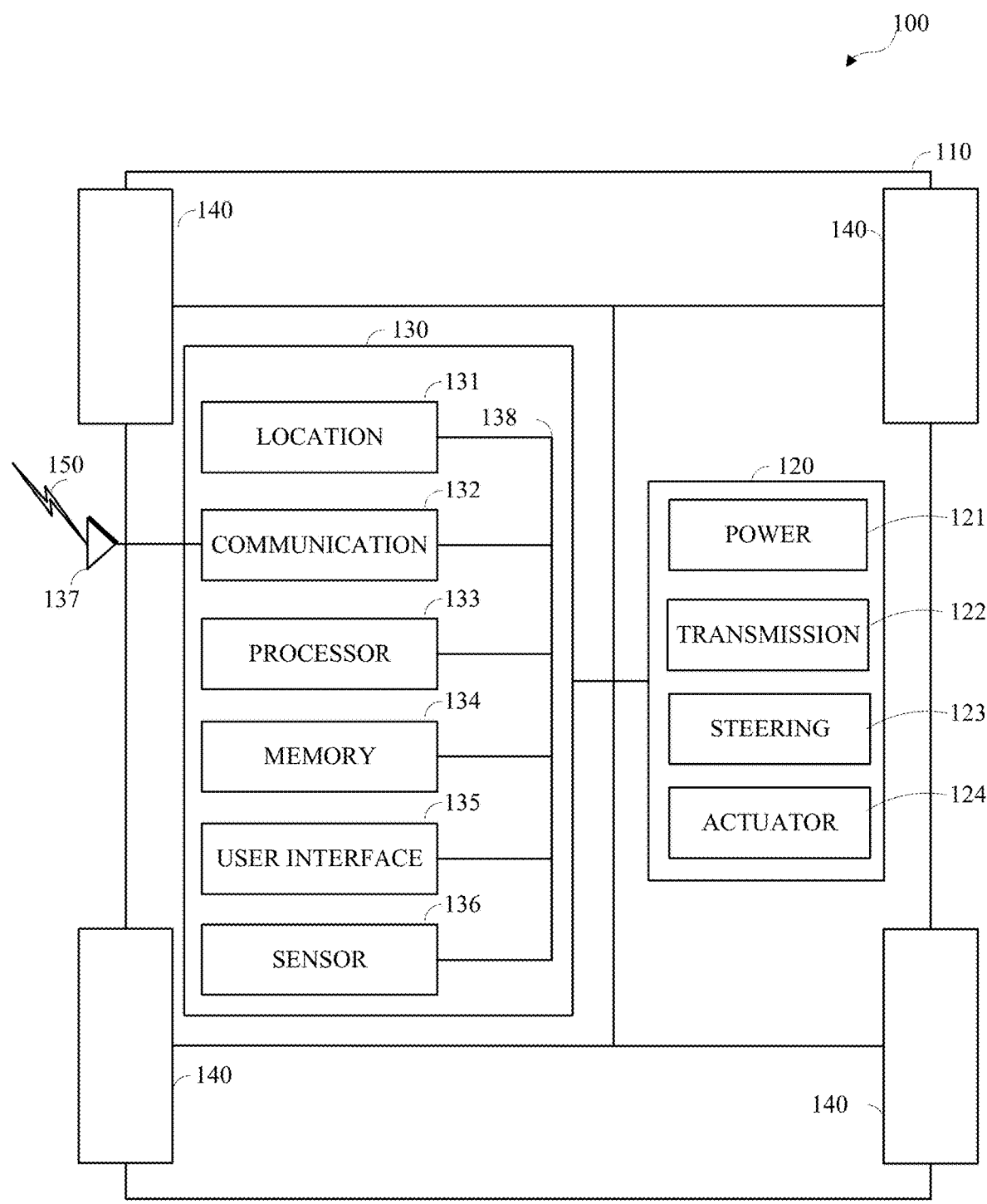
FIG. 1 is a diagram of an example of a vehicle in which the aspects, features, and elements disclosed herein may be implemented.

As described above, traffic congestion has a high cost, for example, in lost person-hours, excess carbon emissions, and increased likelihood of vehicle accidents. The proportion of vehicles on a roadway that are connected vehicles (CVs), capable of transmitting data to over a network, and connected automated vehicles (CAVs), capable of transmitting data over the network and receiving control signals over the network, is increasing. Techniques for leveraging CV or CAV technology for reducing traffic congestion may be desirable.

According to some embodiments, a vehicle control server (which may be implemented as one or more physical or virtual machines) accesses vehicle data from each CV of a subset of multiple CVs on a roadway portion. The vehicle data may also be accessed from roadway sensors. The vehicle data may include a position of the vehicle providing the data or another vehicle, a velocity of the vehicle providing the data or another vehicle, and/or a following distance of the vehicle providing the data or another vehicle. The vehicle control server stores the accessed vehicle data in a long-term shared world model. The vehicle control server generates, using the long-term shared world model, a data structure representing predicted future velocities on the roadway portion by position and time by applying a traffic flow model to the long-term shared world model. The traffic flow model may be, for example, an artificial intelligence model trained using at least one of supervised learning, unsupervised learning, reinforcement learning, online learning, or the like. The vehicle control server transmits, to a CAV, a control signal for controlling operation of the CAV based on the generated data structure.

As used herein, the term "model" may include, among other things, at least one of a classic planning model, an artificial intelligence (AI) model, or a machine learning (ML) model that uses supervised learning, unsupervised learning, reinforcement learning, or the like. A model may be based on data that was generated in the past and may be used to predict future data. For example, a long-term shared world model of a roadway portion may store data about average velocities and congestion (e.g., number of vehicles per unit distance) of the roadway portion in the past (e.g., at multiple times in the past three years) and be used to predict the average velocities and the congestion of the roadway portion in the future (e.g., next Monday morning at 9 am). The prediction may be made, for example, using AI or ML techniques or other mathematical modeling techniques.

As used herein, the term "shared" may indicate, among other things, that a shared item is accessed by at least two entities. For example, at least two vehicles may contribute data to and/or receive data derived from a shared model. As used herein, the term "long-term" indicates that data is based on a time period exceeding a threshold. For example, a long-term model may be based on data generated over a time period that exceeds one hour, two hours, one day, three days, one week, five weeks, one month, six months, one year, or the like. As used herein, the term "world" may indicate, among other things, data that is based on two or more points in space.

As used herein, a roadway portion may include a contiguous portion of a roadway (e.g., a 1-2 kilometer stretch of a roadway). A roadway portion may be subdivided into multiple roadway segments. For example, a 1-kilometer roadway portion may be divided into 10 mutually exclusive and collectively exhaustive roadway segments of 100 meters each.

It should be noted that every CAV is a CV. However, a vehicle may be a CV but not a CAV. For example, a vehicle that is operated by a human driver that is capable of transmitting over a network would be a CV but not a CAV. In some implementations, with appropriate permission, CV technology may be implemented by a computing device (e.g., a mobile phone) on board a vehicle. For example, the computing device may determine the vehicle's velocity (e.g., using an on-device global positioning system (GPS) and an on-device clock) and transmit the vehicle's velocity over a network.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor, and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or velocity, of the vehicle 100. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a velocity sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

The autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
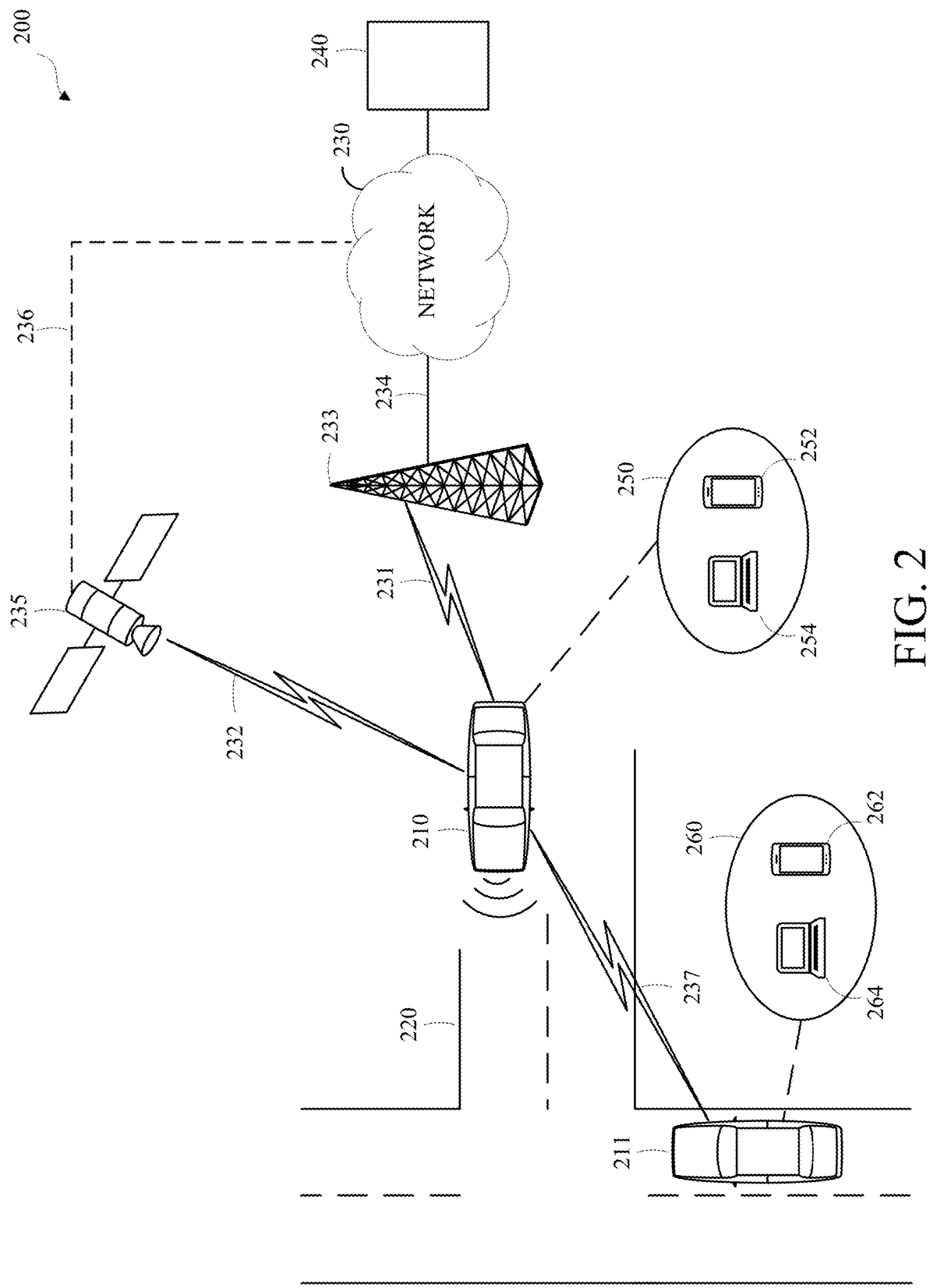
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, velocity information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a velocity sensor, a wheel velocity sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, velocity limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
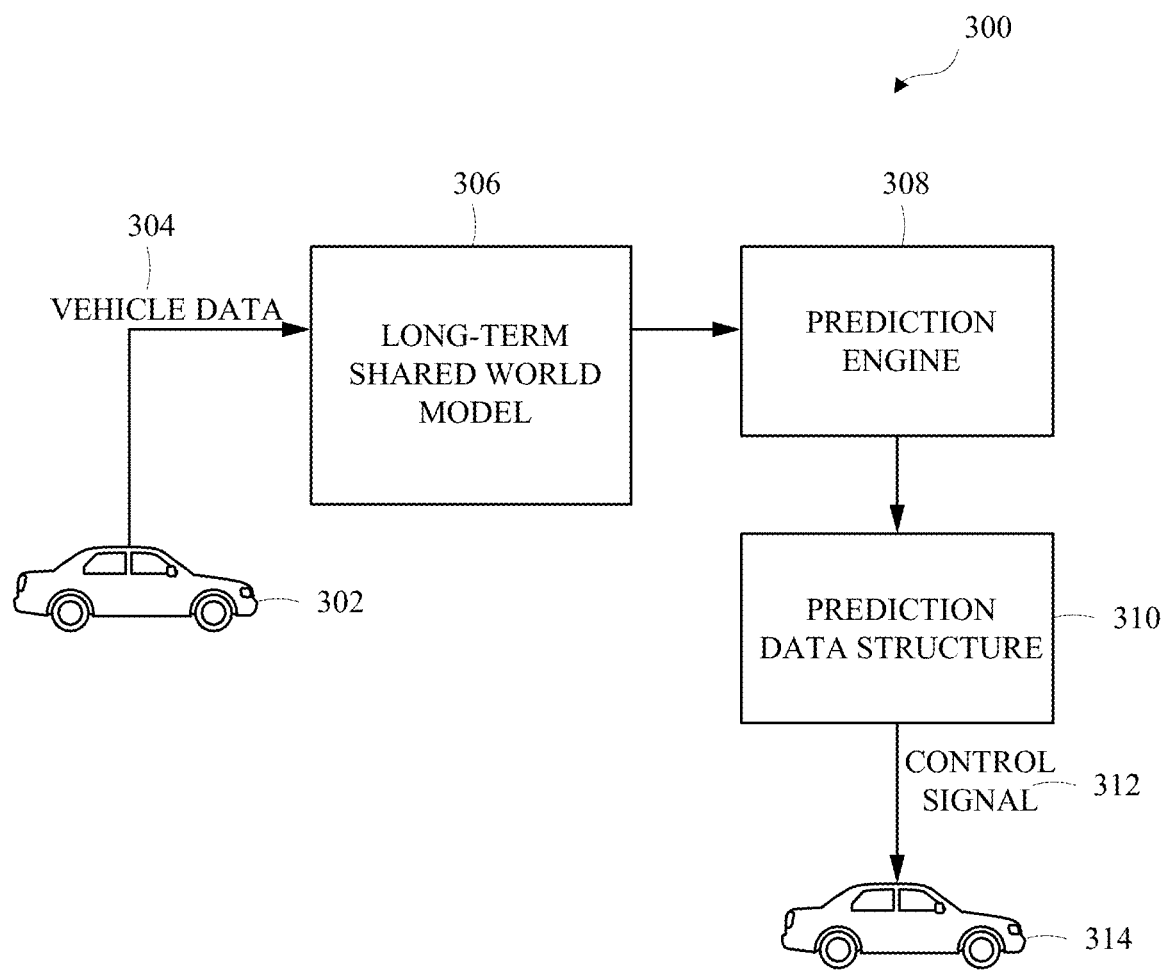
FIG. 3 is a data flow diagram of a technique for using vehicle data to generate a control signal in accordance with embodiments of this disclosure.

FIG. 3 is a data flow diagram of a technique 300 for using vehicle data to generate a control signal in accordance with embodiments of this disclosure.

As shown, a connected vehicle (CV) 302 transmits vehicle data 304 to a long-term shared world model 306. While a single CV 302 is illustrated, multiple CVs, including the CV 302, may transmit vehicle data 304 to the long-term shared world model 306. The vehicle data 304 may include at least one of location data, velocity data, headway (e.g., following distance) data, or the like. The vehicle data 304 may relate to the CV or other vehicles proximate to the CV. While the vehicle data 304 is shown to be transmitted from the CV 302, all or a portion of the vehicle data may be transmitted from a roadway sensor (e.g., a radar, lidar, or computer vision-based sensor). The vehicle data 304 is used to generate or modify the long-term shared world model 306. The long-term shared world model 306 stores historic traffic velocity, congestion, and/or headway data about multiple roadway segments and may be used to predict future traffic velocity, congestion, and/or headway data for all or a portion of the multiple roadway segments. As shown, a prediction engine 308 accesses the long-term shared world model 306 to make a prediction about future traffic velocity, congestion, and/or headway data for a roadway segment. The prediction is stored in a prediction data structure 310. A control signal 312 is generated based on the prediction data structure 310 and transmitted to a connected automated vehicle (CAV) 314. The control signal 312 controls a velocity or a travel path of the CAV 314.

The location data may represent the geographic location of a vehicle. For example, the location data may indicate the latitude and the longitude of the vehicle, the street address of the vehicle, or another identifier of a geographic location. The location data may be obtained, at the vehicle, using roadway sensors, using global positioning system (GPS) technology, and/or using cellular tower triangulation. The velocity data represents a velocity and a direction of travel of the vehicle. The velocity data may include a measurement in units of velocity (e.g., kilometers per hour) and a direction (e.g., n degrees east of north, where n is a number) The headway data represents a distance between a front end of a vehicle and a front end (or, alternatively back end) of another vehicle that that the vehicle is following. The headway data may be measured in units of distance (e.g., meters).

The CV 302 and/or the CAV 314 may correspond to one or more of the vehicles 100, 210, 211. The long-term shared world model 306, the prediction engine 308, and/or the prediction data structure 310 may be implemented using software and/or hardware residing at a server connected to the vehicle transportation networks 220 and/or the electronic communications networks 230. For example, the long-term shared world model 306, the prediction engine 308, and/or the prediction data structure 310 may be implemented using software and/or hardware residing at the communication device 240.

According to some implementations, the long-term shared world model 306 accesses and stores vehicle data 304 from the CV 302. The prediction engine 308 generates, using the long-term shared world model 306, the prediction data structure 310, which represents predicted future velocities on the roadway portion by position and time by applying a traffic flow model to the long-term shared world model 306. The traffic flow model is based on at least one of: an average vehicle velocity in at least one roadway segment during a time slice, a vehicle density in the at least one roadway segment during the time slice, or a flow or net flow of vehicles into or out of the at least one roadway segment during the time slice. The control signal 312 is generated based on the prediction data structure 310, and transmitted to the CAV 314 for controlling operation (e.g., a velocity or a travel path) thereof. The term "time slice" may include, among other things, a contiguous time period, for example, the time period between 4:00 pm and 4:02 pm on Feb. 1, 2022.

Figure 4:
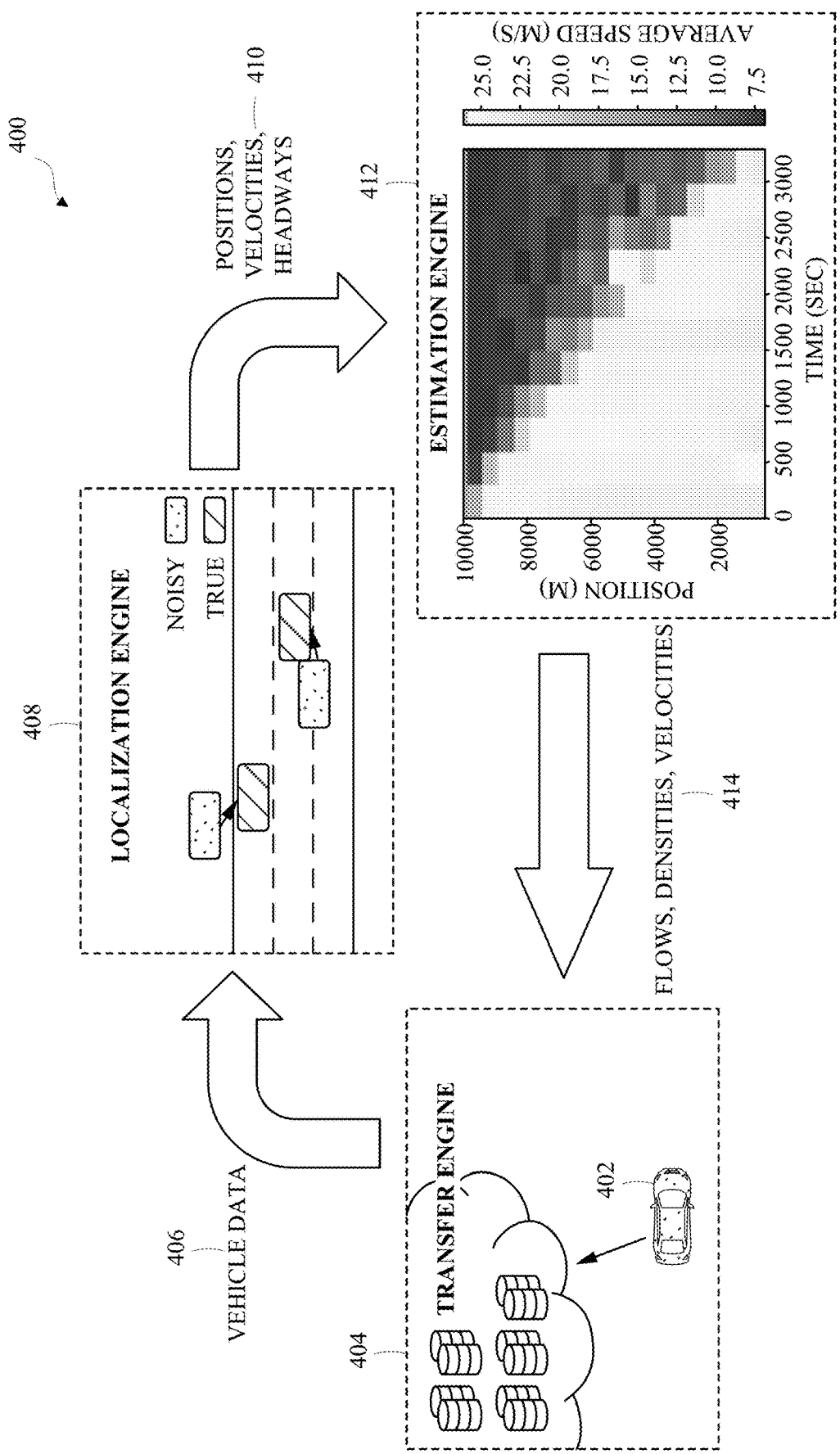
FIG. 4 is a data flow diagram of a long-term shared world model architecture in accordance with embodiments of this disclosure.

FIG. 4 is a data flow diagram of a long-term shared world model architecture 400 in accordance with embodiments of this disclosure. As shown, a vehicle 402 provides vehicle data (e.g., GPS data) to a transfer engine 404. The transfer engine 404 transfers the vehicle data 406 to the localization engine 408. The localization engine 408 computes positions, velocities, and headways 410 of vehicles and provides the positions, velocities, and headways 410 to an estimation engine 412. The estimation engine 412 estimates the flows, densities, and velocities 414 and provides the data to the transfer engine 404 and to the vehicle 402 for controlling the vehicle (e.g., by an autonomous driving engine or by a human driver).

Some implementations relate to reducing traffic congestion. A long-term shared world model 306, 400 may include a traffic state estimator that collects and aggregates data from probe vehicles throughout a network to produce meaningful macroscopic predictions of the state and evolution of traffic. This information is maintained within a database (or other data storage unit) and provided to control policies at later stages to assist in improving the decision-making and coordination by CVs and CAVs.

The transfer engine 404 aggregates data into the vehicle data 406 from the vehicle 402 (which may be a CV or a CAV) and, in some cases, other vehicles, into a shared data repository stored on a network and accessible in real-time. The transfer engine 404 may collect GPS, controller area network (CAN), and other available data sources from the vehicles 402 and may transmit these data to a server. The transfer engine 404 also stores data that is accessible by the vehicle 402. The structure of the shared repository available may be optimized to reduce the overhead associated with storing and accessing individual vehicle data-points.

The localization engine 408 extracts and processes relevant information from the vehicle data 406. The vehicle data 406 may be collected from the shared data repository. The localization engine 408 may perform filtering operations to reduce noise. Information gathered by the localization engine 408 for each vehicle i at time t may include the information shown in Table 1.

TABLE 1

$x_i(t)$: position of vehicle i (from some fixed reference point)
$v_i(t)$: velocity of vehicle i
$h_i(t)$: headway between vehicle i and the vehicle leading the vehicle i (front-to-front bumper)
$v_{i,lead}(t)$: velocity of lead vehicle in the same lane as the vehicle i
$v^L_{i,lead}(t)$: velocity of lead vehicle in the lane to the left of the vehicle i
$h^L_{i,lead}(t)$: headway of lead vehicle in the lane to the left of the vehicle i
$v^L_{i,follow}(t)$: velocity of following vehicle in the lane to the left of the vehicle i
$h^L_{i,follow}(t)$: headway of following vehicle in the lane to the left of the vehicle i
$v^R_{i,lead}(t)$: velocity of lead vehicle in the lane to the right of the vehicle i
$h^R_{i,lead}(t)$: headway of lead vehicle in the lane to the right of the vehicle i
$v^R_{i,follow}(t)$: velocity of following vehicle in the lane to the right of the vehicle i
$h^R_{i,follow}(t)$: headway of following vehicle in the lane to the right of the vehicle i The estimation engine 412 collects the information stored by the transfer engine 404 and modified by the localization engine 408 (e.g., the positions, velocities, and headways 410) uses this information to approximate the macroscopic state of traffic at different roadway segments. In particular, consider a roadway portion of length L and a total time of T seconds. N and M are integers. The estimation engine 412 discretizes time and spaced in N steps $J_j$ ($0<=j<=N$) of length $\Delta t = T/N$ and M space cells $I_i$ ($0<=i<=M$) of length $\Delta x = L/M$, and for each time-space region computes the metrics shown in Table 2.

TABLE 2

$v_i^j$: the average velocity of vehicles in roadway segment i over time interval j
$p_i^j$: the vehicle density in roadway segment i over time interval j
$q_i^j$: the flow of vehicles from roadway segment i to roadway segment i + 1 over time interval j The information computed by the estimation engine 412—the flows, densities, and velocities 414—is provided to the transfer engine 404 for storage in data repositories or for use by vehicles (e.g., the vehicle 402) communicating with the transfer engine 404.

One advantage of the architecture 400 is the flexibility provided by the modularity of the different sub-components. This allows some implementations to generalize various features to a number of different vehicles and estimation algorithms. For example, if multiple vehicles with different sensing/communication specifications are utilized, the errors associated with each type of vehicle may be regulated by utilizing a different localization module for each vehicle type, while maintaining all other modules static. Moreover, if the penetration effects or other specifications request that a different estimation traffic state estimation algorithm is to be used, this may simply be replaced without modification of anything else.

The data repositories in the transfer engine 404 may be databases (e.g., SQL, MongoDB, or the like) or other data storage units. The type of information shared between vehicles (e.g., the vehicle 402) accessing the transfer engine 404 may depend on the sensors available onboard. The localization engine 408 may use different filtering techniques for accessing and processing historical data. The estimation engine 412 may leverage different traffic state estimators. For example, statistical or data-driven estimators may be used to produce modestly granular results when less than a threshold amount of data is available. Model-based estimators (e.g., AI or ML estimators) may be used to produce finer-grained estimations when more than the threshold amount of data is available.

For CVs and CAVs to efficiently cooperate and regulate the flow of traffic, the long-term shared world model 306 (or other shared models of traffic state) may be used. Traffic state estimation algorithms may provide techniques for defining such models. Some techniques convert local vehicle sensor data—vehicle positions, headways, and velocities—in quantities capable of defining the shared state among the vehicles in a region of space and time (e.g., one or more roadway portions). Some techniques rely on sparce quantities of data, due, among other things, to limitations in sensing infrastructure. The rise of vehicle automation has greatly improved the quality placed on onboard vehicle sensing, producing vehicles that can perceive not only what is in front of the vehicles, but also what is happening in adjacent lanes. Some implementations leverage the improvement occurring in sensing infrastructure and define a procedure through which these additional observations may be used to improve the quality of existing traffic state estimation methods.

Some implementations relate to replication of Edie flows from the perspective of a probe vehicle. However, the leveraged estimator (to replicate the Edie flows) may be error prone. The errors in the estimation may arise from biases in the sample (probe) vehicle data. In some situations, some vehicles may drive faster or slower (or with longer or shorter headways) than others, and additional corrections may be used to produce more accurate results. In some implementations, $r_1$ may be a velocity correction factor, and $r_2$ may be a headway correction factor for a time-space region (e.g., a roadway portion, a roadway segment, multiple roadway portions, or multiple roadway segments) $A_i^j$, corresponding to space interval i and time interval j. The relationship between true and estimated traffic states may be:

$$q_i^j = \frac{r_1}{r_2} \cdot \hat{q}_i^j, v^j = r_1 \cdot \hat{p}_i^j, \rho_i^j = \frac{1}{r_2} \cdot \hat{p}_i^j \quad \text{Equations 1-3}$$

In the above equations, $q_i^j$ and $q\_hat_i^j$ are the true and predicted average flows, respectively, in space interval i and time interval j; $v_i^j$ and $v\_hat_i^j$ are the true and predicted average velocities, respectively, in space interval i and time interval j; $\rho_i^j$ and $\rho\_hat_i^j$ are the true and predicted average densities, respectively, in space interval i and time interval j.

Some implementations relate to defining values of $r_1$ and $r_2$. The true values of $r_1$ and $r_2$ may rely on global state information, which may be unknown. To estimate the values of $r_1$ and $r_2$, some implementations rely on data from lanes that are adjacent to the lane of the probe vehicle, as well as data from the lane of the probe vehicle. Some implementations collect data on the velocities (e.g., in units of distance divided by units of time) and headways (e.g., in units of distance) from adjacent lanes and the probe lane. For example, the data shown in Table 1 may be collected. After the data is collected, $r_1$ and $r_2$ may be computed as follows:

$$r_1 = \frac{1}{3} \frac{\sum_{n \in P(A_i^j)} \sum_{k \in t_{i,j}^n} [v_n(t) + 0.5(v_{n,lead}^L(t) + v_{n,follow}^L(t) + v_{n,lead}^R(t) + v_{n,follow}^R(t))]}{\sum_{n \in P(A_i^j)} \sum_{k \in t_{i,j}^n} v_n(t)}$$

$$r_2 = \frac{1}{3} \frac{\sum_{n \in P(A_i^j)} \sum_{k \in t_{i,j}^n} [h_n(t) + h_{n,lead}^L(t) + h_{n,follow}^L(t) + h_{n,lead}^R(t) + h_{n,follow}^R(t)]}{\sum_{n \in P(A_i^j)} \sum_{k \in t_{i,j}^n} h_n(t)}$$

Equations 4–5

In the above equations $t_{i,j}^n$ is the time steps vehicle n spends in the region $A_i^j$. The addition of the 0.5 in the velocity correction is designed to balance the effect of each lane on the cumulative estimate. It should be noted that, whenever only a subset of the above data is available, the value is ignored and the smaller subset is averaged across.

Figure 5:
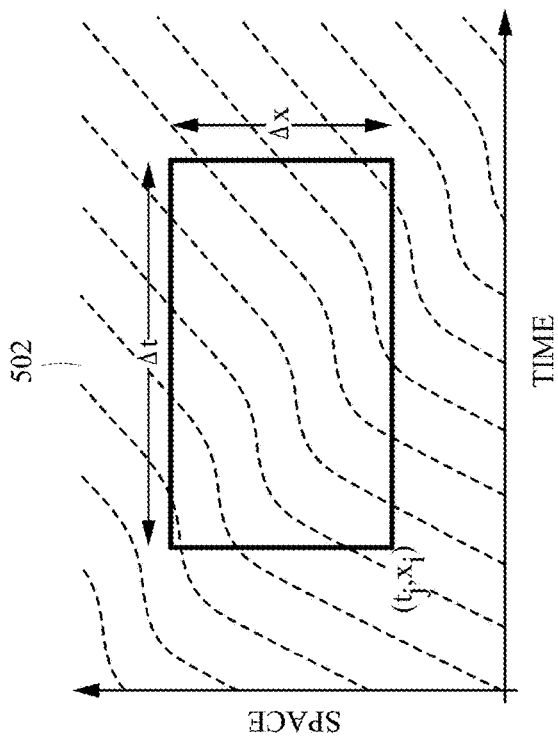
FIG. 5 illustrates flow graphs over space and time in accordance with embodiments of this disclosure.
Figure 6:
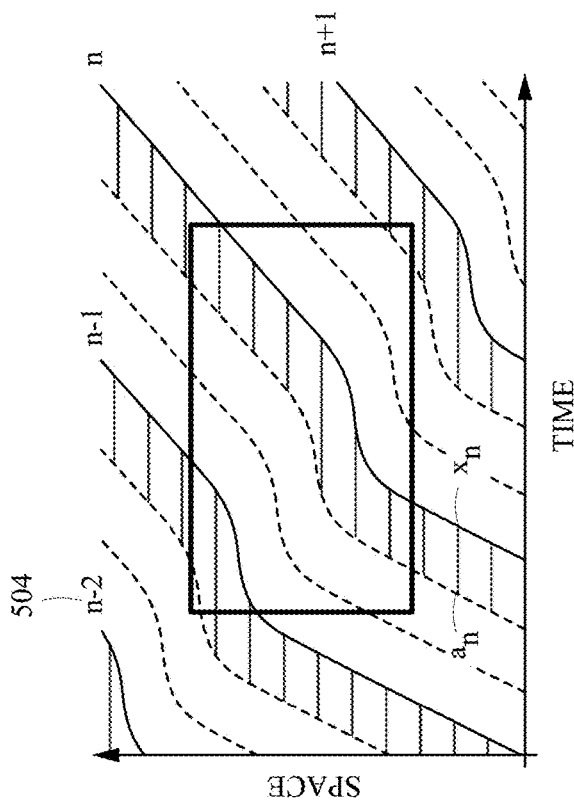
FIG. 6 illustrates the velocity and headway values that are measured for a probe vehicle in accordance with embodiments of this disclosure.
Figure 6:
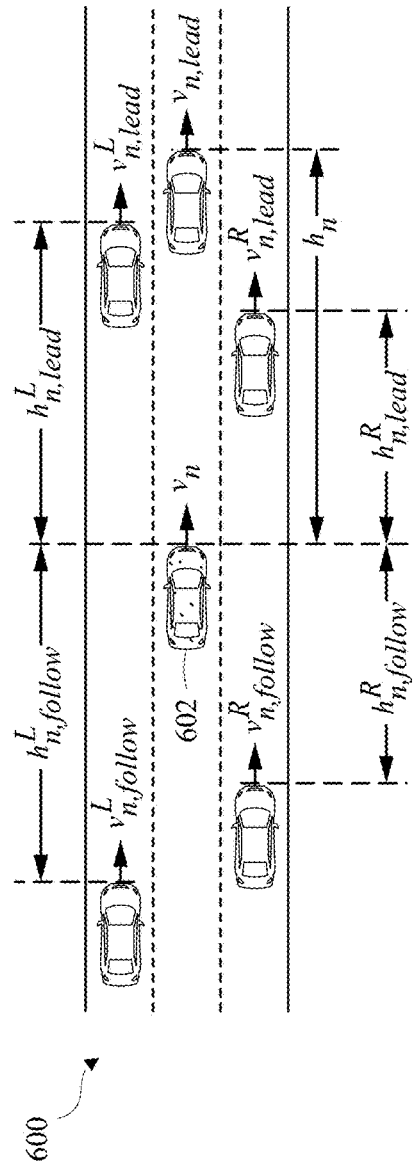

FIG. 5 illustrates flow graphs over space and time. Graph 502 depicts a time-space region and graph 504 depicts data used in the prediction technique disclosed herein. FIG. 6 illustrates the velocity and headway values 600 that are measured for a probe vehicle 602.

This correction may be significant in a number of cases, as variations between driving behaviors between lanes may reduce the accuracy of the generated estimates. Examples of situations where such concerns may arise include the presence of a truck (e.g., which is larger and travelling more slowly than the passenger vehicles) downstream in one lane or the presence of high occupancy vehicle (HOV) or other fast-moving lanes not used by the probe vehicle. By perceiving and correcting for the behaviors of vehicles in adjacent lanes, some implementations may mitigate the effects of lane-level features on the returned estimated values.

In some implementations, the correction factors $r_1$ and $r_2$ may be computed from local, real-time sensor data. Some implementations include Bayesian priors modeling distributions of lane-level dynamics to improve accuracy in the presence of sparse data. Some implementations represent the corrections values for flow and density as a function of the shift in average velocities. This is relevant when either one of the leading or following vehicles in the adjacent lanes cannot be found, thereby presenting quantification of the headway. Defining a form of the flow-density relationship, for example, by using a triangular fundamental diagram, and calibrating the models of this relationship can help produce approximations for the correction factors $r_1$ and $r_2$.

Figure 7:
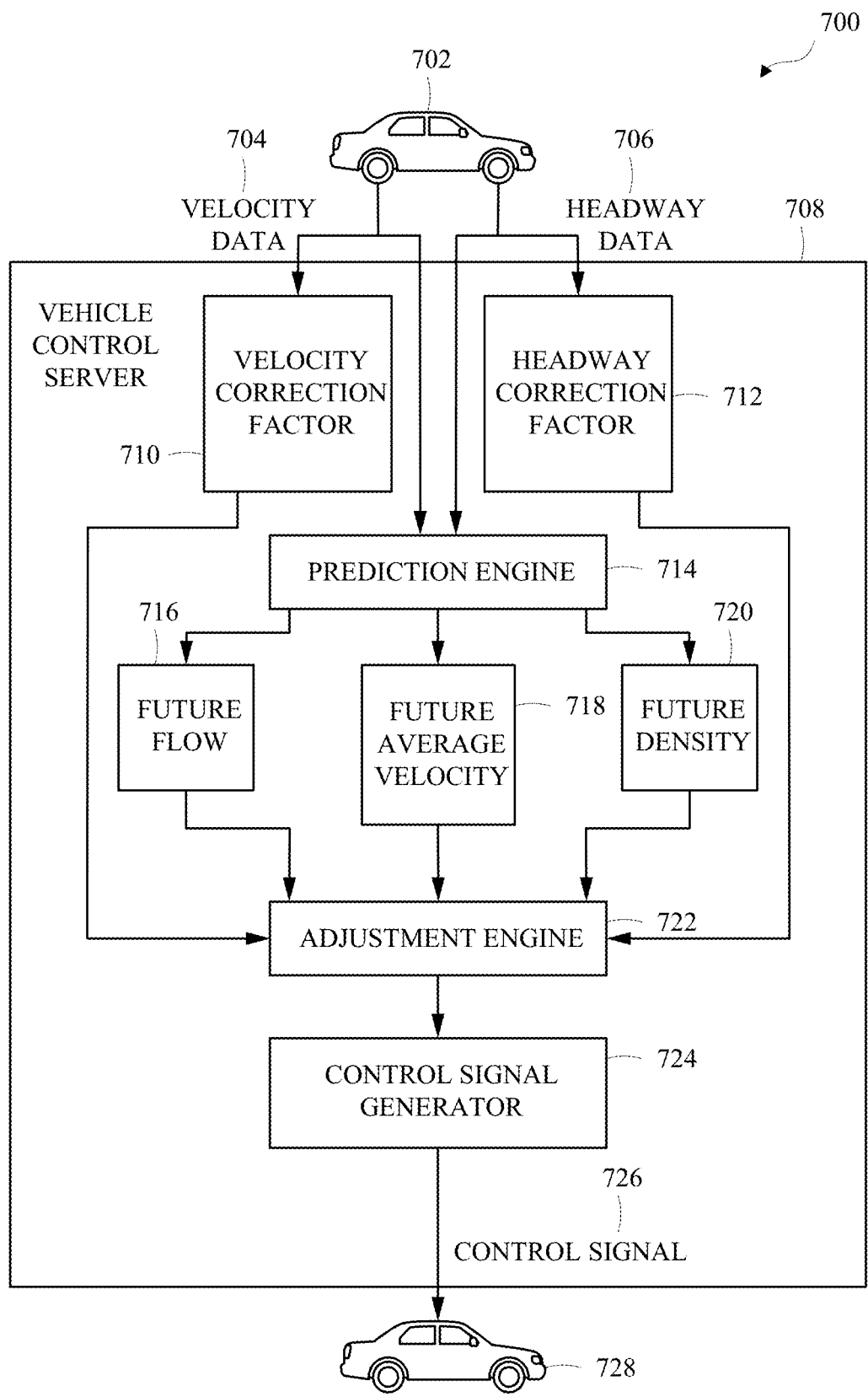
FIG. 7 is a data flow diagram for traffic state determination in accordance with embodiments of this disclosure.

FIG. 7 is a data flow diagram for traffic state determination 700 in accordance with embodiments of this disclosure. As shown in FIG. 7, a CV 702 (e.g., corresponding to the CV 302) provides velocity data 704 and headway data 706 (e.g., all or part of the velocity data and headway data listed in Table 1) to a vehicle control server 708. The vehicle control server 708 computes the velocity correction factor 710 ($r_1$) and the headway correction factor 712 ($r_2$). A prediction engine 714 (e.g., corresponding to the prediction engine 308) accesses the velocity data 704 and the headway data 706, and predicts (e.g., using artificial intelligence, machine learning, and/or mathematical formulas) a future flow 716, a future average velocity 718, and a future density 720 for at least one roadway segment or roadway portion. The predicted future flow 716, future average velocity 718, and future density 720, along with the computed velocity correction factor 710 and headway connection factor 712, are provided to an adjustment engine 722 of the vehicle control server 708. The adjustment engine adjusts the predicted future flow 716, future average velocity 718, and future density 720 and provides an output, based on the adjustments, to a control signal generator 724. The control signal generator 724 generates a control signal 726 for controlling a CAV 728 (e.g., corresponding to CAV 314) and provides the control signal 726 to the CAV 728. The CAV 728 adjusts an operation (e.g., a velocity or a travel path) of the CAV 728 in response to the control signal 726.

Traffic congestion increased fuel consumption and greenhouse gas emissions, while reducing driving comfort and driving safety. Techniques for reducing traffic congestion using connected and/or automated vehicle technology may be desirable.

In some implementations, a portion of vehicles are connected vehicles (vehicles being able to share information to the cloud, but driven manually by human drivers), a portion of vehicles are connected and automated vehicles (vehicles that can share information and are automatically controlled by the cloud), and a portion of vehicles are human-driven vehicles that are neither connected nor automated (without connectivity to the cloud). CVs and CAVs may share, with the cloud, traffic-related measurements with on-board sensors, including vehicle speed, acceleration, relative distances and relative speeds, with surrounding vehicles, and the like.

Figure 8:
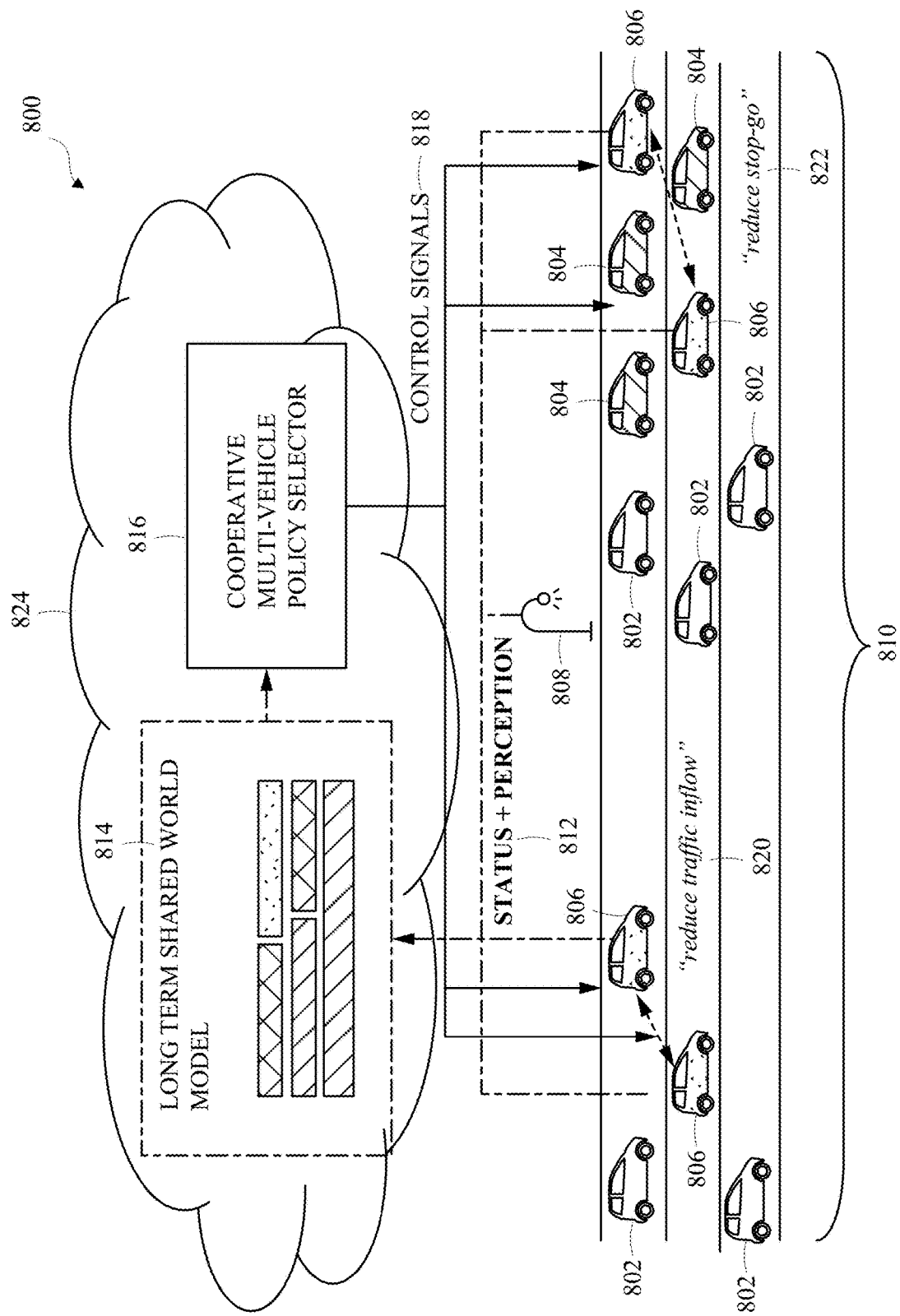
FIG. 8 illustrates an example vehicle communication and control architecture in accordance with embodiments of this disclosure.

FIG. 8 illustrates an example vehicle communication and control architecture 800. As shown, the vehicle communication and control architecture 800 includes non-connected vehicles 802, CVs 804, CAVs 806, and a roadside unit (RSU) 808 on a roadway portion 810. The non-connected vehicles 802 may be legacy vehicles that are operated by a human driver and may not be capable of transmitting traffic state information (e.g., velocity information, travel path information, or information obtained by on-board sensors) to a network. The RSU 808 may include a router for transmitting and receiving network communications to and from the CVs 804 and the CAVs 806. The RSU 808 may include a roadway sensor (e.g., a camera system, a radar system or a lidar system). As shown, the CVs 804, the CAVs 806, and the RSU 808 communicate status and perception data 812 for generating a long-term shared world model 814. The long-term shared world model 814 may correspond to the long-term shared world model 306. As shown, the long-term shared world model 814 is accessed by a cooperative multivehicle policy selector 816. The cooperative multivehicle policy selector 816 transmits control signals 818 to the CAVs 806. The control signals 818 are coordinated and optimized to achieve a traffic control goal, such as reducing traffic inflow 820 or reducing stop-go traffic 822 at various parts of the roadway portion 810. As shown, the long-term shared world model 814 and the cooperative multivehicle policy selector 816 are stored on a network 824, for example, at servers or data repositories connected to the network 824.

According to some implementations, by means of wireless communication, engines of the network 824 (e.g., the long-term shared world model 814 or the cooperative multivehicle policy selector 816) receives and sends information to and from the CVs 804 and/or the CAVs 806. The status and perception data 812 from CVs 804 and/or the CAVs 806 is processed and then control signals 818 are sent to CAVs 806.

The long-term shared world model 814 is a real-time and precise traffic state model based on the status and perception data 812 from the CVs 804 and the CAVs 806. The long-term shared world model 814 is used to provide, to the cooperative multivehicle policy selector 816, information necessary for generating the control signals 818 for the CAVs 806. The data from the long-term shared world model 814 may be used in two ways—to directly share traffic conditions with the CAVs 806 to allow each CAV 806, using its on-board computer, to adapt to the traffic conditions or to have the cooperative multivehicle policy selector 816 determine optimal actions for the CAVs 806 based on macroscopic metrics (e.g., network throughput, traffic speed variations, greenhouse gas emissions, or the like). The optimal action for each CAV 806 is communicated to the associated CAV 806, from the cooperative multivehicle policy selector 816, using the control signals 818. By coordinating the driving behavior of the CAVs 806, traffic flow can be controlled and optimized more effectively, traffic inflow may be reduced in a region of the roadway, and/or stop-go traffic may be reduced.

Figure 9:
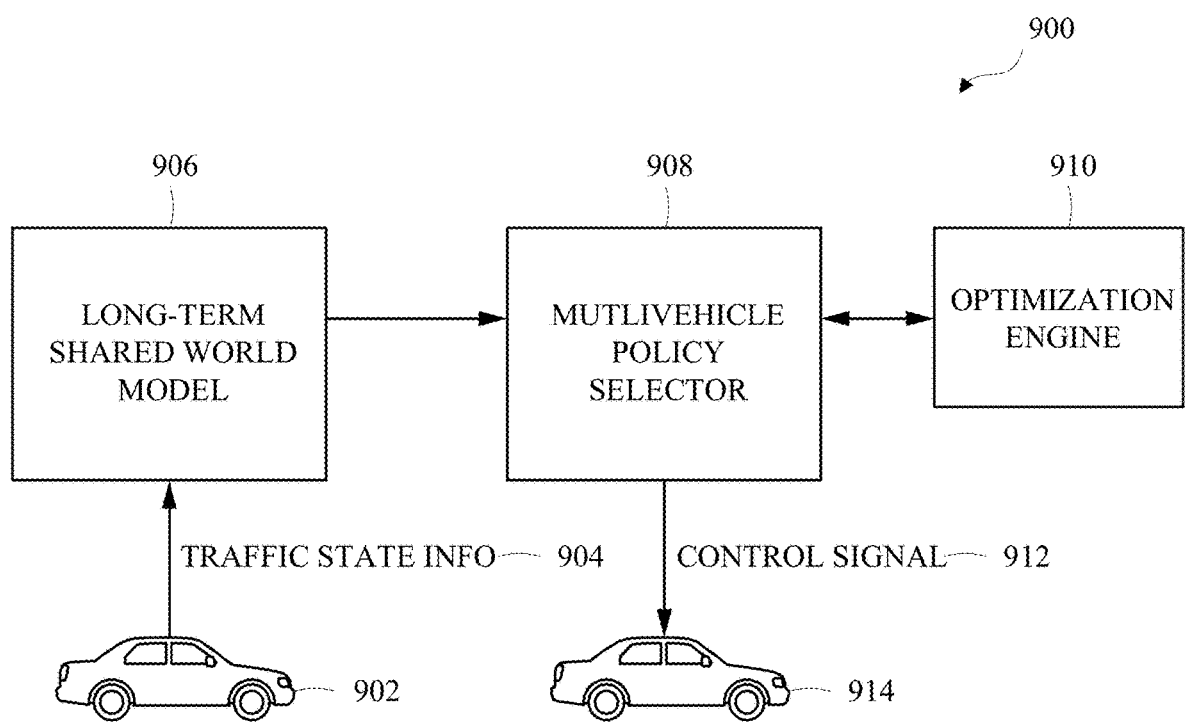
FIG. 9 is a data flow diagram for vehicle communication and control in accordance with embodiments of this disclosure.

FIG. 9 is a data flow diagram for vehicle communication and control 900 in accordance with embodiments of this disclosure. As shown, a CV 902 generates traffic state information 904 and provides the traffic state information 904 to the long-term shared world model 906. The CV 902 may correspond to one of the CVs 804 or one of the CAVs 806. The traffic state information 904 may correspond to the status and perception data 812 or other information generated by or available at the CV 902. The long-term shared world model 906 may correspond to at least one of the long-term shared world models 306, 814.

As shown, the long-term shared world model 906 communicates data to a multivehicle policy selector 908 (e.g., the cooperative multivehicle policy selector 816). The multivehicle policy selector 908 leverages an optimization engine 910 to optimize for traffic conditions (e.g., reducing traffic inflow to a high traffic area and/or reducing stop-go traffic) in order to generate a control signal 912 (e.g., from among the control signals 818) for a CAV 914 (e.g., one of the CAVs 806). The multivehicle policy selector 908 transmits the control signal 912 to the CAV 914. The CAV 914 adjusts its operation (e.g., its speed or its travel path) based on the control signal 912.

Figure 10:
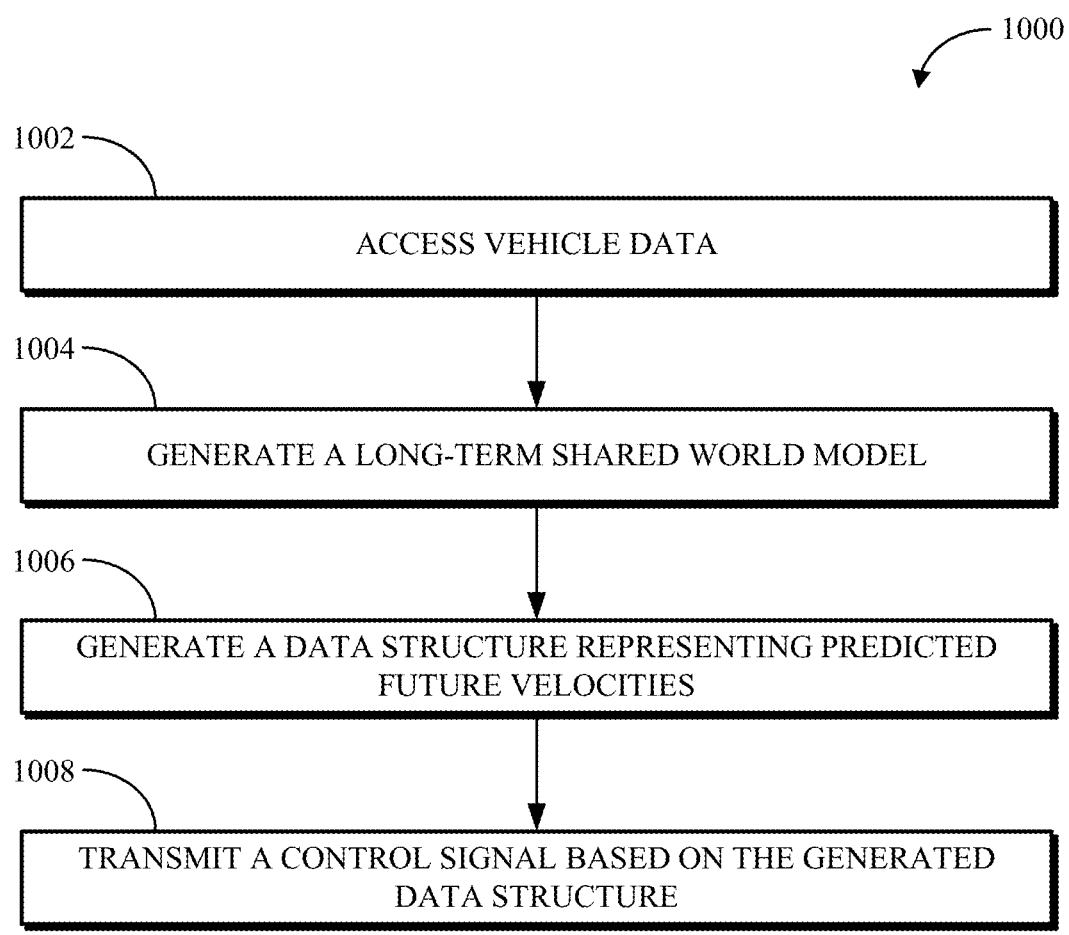
FIG. 10 is a flow chart of a method for operating a vehicle using a long-term shared world model in accordance with embodiments of this disclosure.

FIG. 10 is a flow chart of a method 1000 for operating a vehicle using a long-term shared world model in accordance with embodiments of this disclosure. The method 1000 may be implemented using a server. The server may include a server connected to the vehicle transportation networks 220 and/or the electronic communications networks 230. The server may include a single computing device or multiple computing devices working together.

At block 1002, the server accesses vehicle data from each CV of a subset of a plurality of CVs on a roadway portion. The vehicle data may include at least one of a position, a velocity, or a headway. The server may also access additional data from a roadway sensor. The additional data may include vehicle position data, vehicle velocity data, and/or vehicle headway data. The additional data may be sensed, at the roadway sensor, using computer vision, radar, and/or lidar. The vehicle data may be associated with the CV itself or another vehicle (e.g., another CV or a non-connected vehicle) proximate to the CV whose data is accessible by on-board sensors of the CV. The additional data may be associated with either a CV or a non-connected vehicle.

At block 1004, the server generates, based on the accessed vehicle data and/or the additional data, a long-term shared world model (e.g., one of the long-term shared world models 306, 814, 906). In some cases, the accessed vehicle data is received from a first vehicle and includes the position, the velocity, or the headway of a second vehicle. The first vehicle is distinct from the second vehicle. For example, the second vehicle may be traveling immediately in front of the first vehicle, immediately behind the first vehicle, or in a driving lane adjacent to a driving lane of the first vehicle.

At block 1006, the server generates, using the long-term shared world model, a data structure representing predicted future velocities on the roadway portion by position and time by applying a traffic flow model to the long-term shared world model. For example, the data structure may be a two-dimensional array with one dimension representing roadway segments and another dimensions representing time slices. The value in each cell of the two-dimensional array may represent a predicted future velocity for the corresponding roadway segment and time slice.

According to some implementations, the roadway portion is subdivided into multiple roadway segments. The traffic flow model is based on at least one of an average vehicle velocity in at least one roadway segment during a time slice, a vehicle density in the at least one roadway segment during the time slice, or a flow or net flow of vehicles into or out of the at least one roadway segment during the time slice. The average vehicle velocity, the vehicle density, the flow, or the net flow may be computed using the long-term shared world model.

At block 1008, the server transmits, to a CAV, a control signal for controlling operation of the CAV based on the generated data structure. The CAV may adjust its operation based on the control signal. For example, the CAV may adjust its velocity or its travel path based on the control signal.

Figure 11:
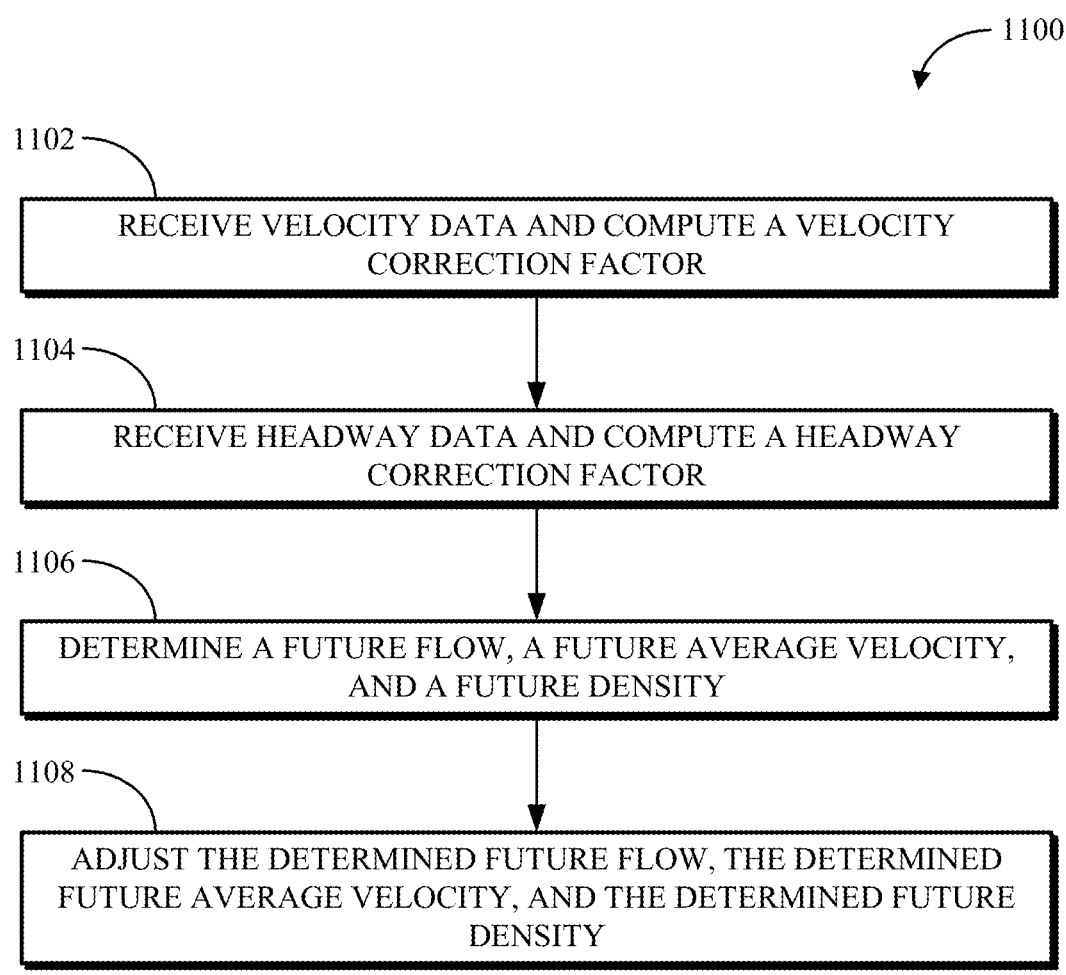
FIG. 11 is a flow chart of a method for predicting future traffic data in accordance with embodiments of this disclosure.

FIG. 11 is a flow chart of a method 1100 for predicting future traffic data in accordance with embodiments of this disclosure. The server may include the vehicle control server 708 or a server connected to the vehicle transportation networks 220 and/or the electronic communications networks 230. The server may include a single computing device or multiple computing devices working together.

At block 1102, the server receives, from a CV, velocity data representing velocities of the CV and additional vehicles proximate to the CV. The server computes a velocity correction factor based on the velocity data, for example, using Equation 4 described above. The additional vehicles proximate to the CAV may include a vehicle in front of the CV in a lane adjacent to the CV or a vehicle behind the CV in a lane adjacent to the CV.

At block 1104, the server receives, from the CV, headway data representing a headway of the CV and the additional vehicles proximate to the CV. The server computes a headway correction factor based on the headway data, for example, using Equation 5 described above. In some implementations, the server receives the velocity data and the headway data from multiple CVs, including the CV. The velocity correction factor is computed based on the velocity data from the multiple CVs. The headway correction factor is computed based on the headway data from the multiple CVs.

At block 1106, the server determines, using a prediction engine at the server, a future flow, a future average velocity, and a future density for a segment of the roadway. In some implementations, the prediction engine leverages a long-term shared world model (e.g., one of the long-term shared world models 306, 814, 906) storing data received from the multiple CVs and multiple roadway sensors.

At block 1108, the server adjusts the determined future flow based on the velocity correction factor and the headway correction factor. The server adjusts the determined future average velocity based on the velocity correction factor. The server adjusts the determined future density based on the headway correction factor. Adjusting the determined future flow based on the velocity correction factor and the headway correction factor may include multiplying the determined future flow by a quotient of the velocity correction factor and the headway correction factor. Adjusting the determined future average velocity based on the velocity correction factor may include multiplying the determined future average velocity by the velocity correction factor. Adjusting the determined future density based on the headway correction factor may include dividing the determined future density by the headway correction factor.

According to some implementations, the server generates a control signal for a CAV based on at least one of: the determined future flow, the determined future average velocity, or the determined future density. The server transmits the generated control signal to the CAV.

Figure 12:
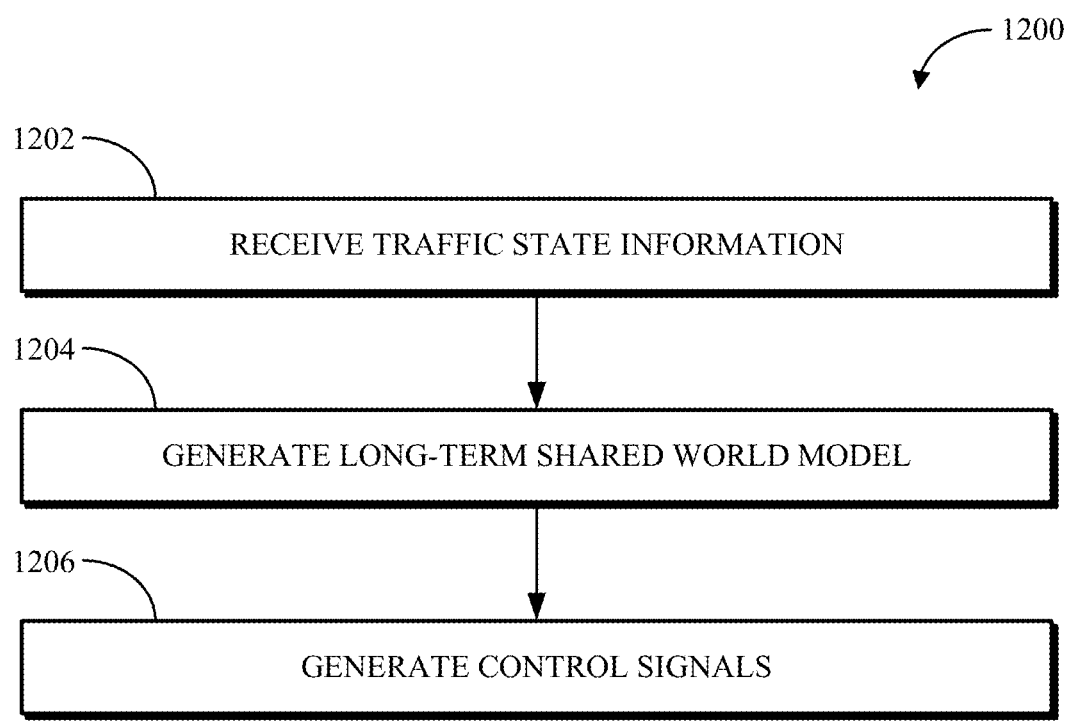
FIG. 12 is a flow chart of a method for controlling a vehicle using a multivehicle policy selector in accordance with embodiments of this disclosure.

FIG. 12 is a flow chart of a method 1200 for controlling a vehicle using a multivehicle policy selector in accordance with embodiments of this disclosure. The method 1200 may be implemented using a server. The server may include a server connected to the vehicle transportation networks 220 and/or the electronic communications networks 230. The server may include a single computing device or multiple computing devices working together.

At block 1202, the server receives traffic state information from roadway sensors, CVs, and CAVs. The traffic state information may include at least one of a location of a vehicle, a speed of the vehicle, a following distance between the vehicle and another vehicle, and a number of vehicles on the roadway portion. The vehicle may be a non-connected vehicle, a CV, or a CAV. For the non-connected vehicle, the traffic state information may be determined (and transmitted to the server) by at least one of a roadway sensor, a CV, or a CAV proximate to the non-connected vehicle. The CVs, CAVs, and/or non-connected vehicles may be traveling on the roadway portion. Alternatively, the CVs, CAVs, and/or non-connected vehicles may include a vehicle that is not traveling on the roadway portion (e.g., a vehicle that is approaching the roadway portion or a vehicle that has recently left the roadway portion).

At block 1204, the server generates, based on the received traffic state information, a long-term shared world model (e.g., one of the long-term shared world models 306, 814, 906). The long-term shared world model may use any modeling technique. For example, the long-term shared world model may use statistical modeling, machine learning, or artificial intelligence techniques.

At block 1206, the server generates, using a multivehicle policy selector (e.g., the multivehicle policy selector 908), control signals to control the CAVs based on the long-term shared world model. The multivehicle policy selector generates the control signals using an optimization to reduce congestion on a roadway portion. Each control signal is transmitted to an associated CAV and controls a velocity or a travel path of the associated CAV. The optimization to reduce the congestion on the roadway includes ensuring at least a minimum threshold following distance between each CAV and a vehicle in front of the CAV.

Some implementations are described below as numbered examples (Example 1, 2, 3, etc.). These examples are provided as examples only and do not limit the other implementations disclosed herein.

Example 1 is a method for generating and transmitting a control signal to a vehicle, the method comprising: accessing vehicle data from each connected vehicle (CV) of a subset of a plurality of CVs on a roadway portion, the vehicle data comprising at least one of: a position, a velocity, or a headway; generating, based on the accessed vehicle data, a long-term shared world model; generating, using the long-term shared world model, a data structure representing predicted future velocities on the roadway portion by position and time by applying a traffic flow model to the long-term shared world model; and transmitting, to a connected autonomous vehicle (CAV), a control signal for controlling operation of the CAV based on the generated data structure.

In Example 2, the subject matter of Example 1 includes, accessing additional data from a roadway sensor, the additional data comprising at least one of: vehicle position data, vehicle velocity data, or vehicle headway data; and storing the accessed additional data in the long-term shared world model.

In Example 3, the subject matter of Examples 1-2 includes, wherein the vehicle position data, the vehicle velocity data, or the vehicle headway data is associated with a non-connected vehicle.

In Example 4, the subject matter of Examples 1-3 includes, wherein the roadway portion is subdivided into multiple roadway segments, wherein the traffic flow model is based on at least one of: an average vehicle velocity in at least one roadway segment during a time slice, a vehicle density in the at least one roadway segment during the time slice, or a flow or net flow of vehicles into or out of the at least one roadway segment during the time slice.

In Example 5, the subject matter of Example 4 includes, wherein the average vehicle velocity, the vehicle density, the flow, or the net flow is computed using the long-term shared world model.

In Example 6, the subject matter of Examples 1-5 includes, wherein the accessed vehicle data is received from a first vehicle and comprises the position, the velocity, or the headway of a second vehicle, wherein the first vehicle is distinct from the second vehicle.

In Example 7, the subject matter of Example 6 includes, wherein the second vehicle is traveling immediately in front of the first vehicle, immediately behind the first vehicle, or in a driving lane adjacent to a driving lane of the first vehicle.

Example 8 is an apparatus for generating and transmitting a control signal to a vehicle, the apparatus comprising: a memory storing instructions; and a processor to execute the stored instructions to: access vehicle data from each connected vehicle (CV) of a subset of a plurality of CVs on a roadway portion, the vehicle data comprising at least one of: a position, a velocity, or a headway; generate, based on the accessed vehicle data, a long-term shared world model; generate, using the long-term shared world model, a data structure representing predicted future velocities on the roadway portion by position and time by applying a traffic flow model to the long-term shared world model; and transmit, to a connected autonomous vehicle (CAV), a control signal for controlling operation of the CAV based on the generated data structure.

In Example 9, the subject matter of Example 8 includes, the processor to execute the stored instructions to: access additional data from a roadway sensor, the additional data comprising at least one of: vehicle position data, vehicle velocity data, or vehicle headway data; and store the accessed additional data in the long-term shared world model.

In Example 10, the subject matter of Examples 8-9 includes, wherein the vehicle position data, the vehicle velocity data, or the vehicle headway data is associated with a non-connected vehicle.

In Example 11, the subject matter of Examples 8-10 includes, wherein the roadway portion is subdivided into multiple roadway segments, wherein the traffic flow model is based on at least one of: an average vehicle velocity in at least one roadway segment during a time slice, a vehicle density in the at least one roadway segment during the time slice, or a flow or net flow of vehicles into or out of the at least one roadway segment during the time slice.

In Example 12, the subject matter of Example 11 includes, wherein the average vehicle velocity, the vehicle density, the flow, or the net flow is computed using the long-term shared world model.

In Example 13, the subject matter of Examples 8-12 includes, wherein the accessed vehicle data is received from a first vehicle and comprises the position, the velocity, or the headway of a second vehicle, wherein the first vehicle is distinct from the second vehicle.

In Example 14, the subject matter of Example 13 includes, wherein the second vehicle is traveling immediately in front of the first vehicle, immediately behind the first vehicle, or in a driving lane adjacent to a driving lane of the first vehicle.

Example 15 is a non-transitory computer-readable medium storing instructions which, when executed by a processor, cause the processor to perform operations comprising: accessing vehicle data from each connected vehicle (CV) of a subset of a plurality of CVs on a roadway portion, the vehicle data comprising at least one of: a position, a velocity, or a headway; generating, based on the accessed vehicle data, a long-term shared world model; generating, using the long-term shared world model, a data structure representing predicted future velocities on the roadway portion by position and time by applying a traffic flow model to the long-term shared world model; and transmitting, to a connected autonomous vehicle (CAV), a control signal for controlling operation of the CAV based on the generated data structure.

In Example 16, the subject matter of Example 15 includes, the operations further comprising: accessing additional data from a roadway sensor, the additional data comprising at least one of: vehicle position data, vehicle velocity data, or vehicle headway data; and storing the accessed additional data in the long-term shared world model.

In Example 17, the subject matter of Examples 15-16 includes, wherein the vehicle position data, the vehicle velocity data, or the vehicle headway data is associated with a non-connected vehicle.

In Example 18, the subject matter of Examples 15-17 includes, wherein the roadway portion is subdivided into multiple roadway segments, wherein the traffic flow model is based on at least one of: an average vehicle velocity in at least one roadway segment during a time slice, a vehicle density in the at least one roadway segment during the time slice, or a flow or net flow of vehicles into or out of the at least one roadway segment during the time slice.

In Example 19, the subject matter of Example 18 includes, wherein the average vehicle velocity, the vehicle density, the flow, or the net flow is computed using the long-term shared world model.

In Example 20, the subject matter of Examples 15-19 includes, wherein the accessed vehicle data is received from a first vehicle and comprises the position, the velocity, or the headway of a second vehicle, wherein the first vehicle is distinct from the second vehicle.

Example 21 is a method comprising: receiving, at a control server and from a connected vehicle (CV), velocity data representing velocities of the CV and additional vehicles proximate to the CV; computing a velocity correction factor based on the velocity data; receiving, at the control server and from the CV, headway data representing a headway of the CV and the additional vehicles proximate to the CV; computing a headway correction factor based on the headway data; determining, using a prediction engine at the control server, a future flow, a future average velocity, and a future density for a segment of a roadway; adjusting the determined future flow based on the velocity correction factor and the headway correction factor; adjusting the determined future average velocity based on the velocity correction factor; adjusting the determined future density based on the headway correction factor; generating, at the control server, a control signal for a connected automated vehicle (CAV) based on at least one of: the determined future flow, the determined future average velocity, or the determined future density; and transmitting the generated control signal to the CAV.

In Example 22, the subject matter of Example 21 includes, wherein the additional vehicles proximate to the CV comprise at least one of: a vehicle in front of the CV in a lane adjacent to the CV or a vehicle behind the CV in a lane adjacent to the CV.

In Example 23, the subject matter of Examples 21-22 includes, wherein the control server receives the velocity data and the headway data from multiple CVs, including the CV, wherein the velocity correction factor is computed based on the velocity data from the multiple CVs, wherein the headway correction factor is computed based on the headway data from the multiple CVs.

In Example 24, the subject matter of Examples 21-23 includes, wherein the prediction engine leverages a long-term shared world model storing data received from the multiple CVs and multiple roadway sensors.

In Example 25, the subject matter of Examples 21-24 includes, wherein adjusting the determined future flow based on the velocity correction factor and the headway correction factor comprises: multiplying the determined future flow by a quotient of the velocity correction factor and the headway correction factor.

In Example 26, the subject matter of Examples 21-25 includes, wherein adjusting the determined future average velocity based on the velocity correction factor comprises: multiplying the determined future average velocity by the velocity correction factor.

In Example 27, the subject matter of Examples 21-26 includes, wherein adjusting the determined future density based on the headway correction factor comprises: dividing the determined future density by the headway correction factor.

Example 28 is an apparatus comprising: a memory storing instructions; and a processor to execute the stored instructions to: receive, at a control server and from a connected vehicle (CV), velocity data representing velocities of the CV and additional vehicles proximate to the CV; compute a velocity correction factor based on the velocity data; receive, at the control server and from the CV, headway data representing a headway of the CV and the additional vehicles proximate to the CV; compute a headway correction factor based on the headway data; determine, using a prediction engine at the control server, a future flow, a future average velocity, and a future density for a segment of a roadway; adjust the determined future flow based on the velocity correction factor and the headway correction factor; adjust the determined future average velocity based on the velocity correction factor; adjust the determined future density based on the headway correction factor; generate, at the control server, a control signal for a connected automated vehicle (CAV) based on at least one of: the determined future flow, the determined future average velocity, or the determined future density; and transmit the generated control signal to the CAV.

In Example 29, the subject matter of Example 28 includes, wherein the additional vehicles proximate to the CV comprise at least one of: a vehicle in front of the CV in a lane adjacent to the CV or a vehicle behind the CV in a lane adjacent to the CV.

In Example 30, the subject matter of Examples 28-29 includes, wherein the control server receives the velocity data and the headway data from multiple CVs, including the CV, wherein the velocity correction factor is computed based on the velocity data from the multiple CVs, wherein the headway correction factor is computed based on the headway data from the multiple CVs.

In Example 31, the subject matter of Examples 28-30 includes, wherein the prediction engine leverages a long-term shared world model storing data received from the multiple CVs and multiple roadway sensors.

In Example 32, the subject matter of Examples 28-31 includes, wherein adjusting the determined future flow based on the velocity correction factor and the headway correction factor comprises: multiplying the determined future flow by a quotient of the velocity correction factor and the headway correction factor.

In Example 33, the subject matter of Examples 28-32 includes, wherein adjusting the determined future average velocity based on the velocity correction factor comprises: multiplying the determined future average velocity by the velocity correction factor.

In Example 34, the subject matter of Examples 28-33 includes, wherein adjusting the determined future density based on the headway correction factor comprises: dividing the determined future density by the headway correction factor.

Example 35 is a non-transitory computer-readable medium storing instructions which, when executed by a processor, cause the processor to perform operations comprising: receiving, at a control server and from a connected vehicle (CV), velocity data representing velocities of the CV and additional vehicles proximate to the CV; computing a velocity correction factor based on the velocity data; receiving, at the control server and from the CV, headway data representing a headway of the CV and the additional vehicles proximate to the CV; computing a headway correction factor based on the headway data; determining, using a prediction engine at the control server, a future flow, a future average velocity, and a future density for a segment of a roadway; adjusting the determined future flow based on the velocity correction factor and the headway correction factor; adjusting the determined future average velocity based on the velocity correction factor; adjusting the determined future density based on the headway correction factor; generating, at the control server, a control signal for a connected automated vehicle (CAV) based on at least one of: the determined future flow, the determined future average velocity, or the determined future density; and transmitting the generated control signal to the CAV.

In Example 36, the subject matter of Example 35 includes, wherein the additional vehicles proximate to the CV comprise at least one of: a vehicle in front of the CV in a lane adjacent to the CV or a vehicle behind the CV in a lane adjacent to the CV.

In Example 37, the subject matter of Examples 35-36 includes, wherein the control server receives the velocity data and the headway data from multiple CVs, including the CV, wherein the velocity correction factor is computed based on the velocity data from the multiple CVs, wherein the headway correction factor is computed based on the headway data from the multiple CVs.

In Example 38, the subject matter of Examples 35-37 includes, wherein the prediction engine leverages a long-term shared world model storing data received from the multiple CVs and multiple roadway sensors.

In Example 39, the subject matter of Examples 35-38 includes, wherein adjusting the determined future flow based on the velocity correction factor and the headway correction factor comprises: multiplying the determined future flow by a quotient of the velocity correction factor and the headway correction factor.

In Example 40, the subject matter of Examples 35-39 includes, wherein adjusting the determined future average velocity based on the velocity correction factor comprises: multiplying the determined future average velocity by the velocity correction factor.

Example 41 is a method comprising: receiving traffic state information from roadway sensors, connected vehicles (CVs), and connected automated vehicles (CAVs); generating, based on the received traffic state information, a long-term shared world model; and generating, using a multivehicle policy selector, control signals to control the CAVs based on the long-term shared world model, wherein the multivehicle policy selector generates the control signals using an optimization to reduce congestion on a roadway portion, wherein each control signal controls a velocity or a travel path of an associated CAV.

In Example 42, the subject matter of Example 41 includes, wherein the optimization to reduce the congestion on the roadway comprises ensuring at least a minimum threshold following distance between each CAV and a vehicle in front of the CAV.

In Example 43, the subject matter of Examples 41-42 includes, wherein the traffic state information comprises at least one of a location of a vehicle, a speed of the vehicle, a following distance between the vehicle and another vehicle, and a number of vehicles on the roadway portion.

In Example 44, the subject matter of Example 43 includes, wherein the vehicle comprises a CV or a CAV.

In Example 45, the subject matter of Examples 43-44 includes, wherein the vehicle comprises a non-connected vehicle, wherein the traffic state information of the non-connected vehicle is determined using one or more of the roadway sensors.

In Example 46, the subject matter of Examples 43-45 includes, wherein the vehicle comprises a non-connected vehicle, wherein the traffic state information of the non-connected vehicle is determined using at least one of the CVs or the CAVs.

In Example 47, the subject matter of Examples 41-46 includes, wherein the CVs, the CAVs, and non-connected vehicles are traveling on the roadway portion.

In Example 48, the subject matter of Examples 41-47 includes, wherein the CVs or the CAVs comprise at least one vehicle that is not on the roadway portion.

Example 49 is an apparatus comprising: a memory storing instructions; and a processor to execute the stored instructions to: receive traffic state information from roadway sensors, connected vehicles (CVs), and connected automated vehicles (CAVs); generate, based on the received traffic state information, a long-term shared world model; and generate, using a multivehicle policy selector, control signals to control the CAVs based on the long-term shared world model, wherein the multivehicle policy selector generates the control signals using an optimization to reduce congestion on a roadway portion, wherein each control signal controls a velocity or a travel path of an associated CAV.

In Example 50, the subject matter of Example 49 includes, wherein the optimization to reduce the congestion on the roadway comprises ensuring at least a minimum threshold following distance between each CAV and a vehicle in front of the CAV.

In Example 51, the subject matter of Examples 49-50 includes, wherein the traffic state information comprises at least one of a location of a vehicle, a speed of the vehicle, a following distance between the vehicle and another vehicle, and a number of vehicles on the roadway portion.

In Example 52, the subject matter of Example 51 includes, wherein the vehicle comprises a CV or a CAV.

In Example 53, the subject matter of Examples 51-52 includes, wherein the vehicle comprises a non-connected vehicle, wherein the traffic state information of the non-connected vehicle is determined using one or more of the roadway sensors.

In Example 54, the subject matter of Examples 51-53 includes, wherein the vehicle comprises a non-connected vehicle, wherein the traffic state information of the non-connected vehicle is determined using at least one of the CVs or the CAVs.

In Example 55, the subject matter of Examples 49-54 includes, wherein the CVs, the CAVs, and non-connected vehicles are traveling on the roadway portion.

In Example 56, the subject matter of Examples 49-55 includes, wherein the CVs or the CAVs comprise at least one vehicle that is not on the roadway portion.

Example 57 is a non-transitory computer-readable medium storing instructions which, when executed by a processor, cause the processor to perform operations comprising: receiving traffic state information from roadway sensors, connected vehicles (CVs), and connected automated vehicles (CAVs); generating, based on the received traffic state information, a long-term shared world model; and generating, using a multivehicle policy selector, control signals to control the CAVs based on the long-term shared world model, wherein the multivehicle policy selector generates the control signals using an optimization to reduce congestion on a roadway portion, wherein each control signal controls a velocity or a travel path of an associated CAV.

In Example 58, the subject matter of Example 57 includes, wherein the optimization to reduce the congestion on the roadway comprises ensuring at least a minimum threshold following distance between each CAV and a vehicle in front of the CAV.

In Example 59, the subject matter of Examples 57-58 includes, wherein the traffic state information comprises at least one of a location of a vehicle, a speed of the vehicle, a following distance between the vehicle and another vehicle, and a number of vehicles on the roadway portion.

In Example 60, the subject matter of Example 59 includes, wherein the vehicle comprises a CV or a CAV.

Example 61 is at least one machine-readable medium including instructions that, when executed by processing circuitry, cause the processing circuitry to perform operations to implement of any of Examples 1-60.

Example 62 is an apparatus comprising means to implement of any of Examples 1-60.

Example 63 is a system to implement of any of Examples 1-60.

Example 64 is a method to implement of any of Examples 1-60.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method comprising:
   receiving, at a control server and from a connected vehicle (CV), velocity data representing velocities of the CV and additional vehicles proximate to the CV;
   computing a velocity correction factor based on the velocity data;
   receiving, at the control server and from the CV, headway data representing a headway of the CV and the additional vehicles proximate to the CV;
   computing a headway correction factor based on the headway data;
   determining, using a prediction engine at the control server, a future flow, a future average velocity, and a future density for a segment of a roadway;
   adjusting the determined future flow based on the velocity correction factor and the headway correction factor;
   adjusting the determined future average velocity based on the velocity correction factor;
   adjusting the determined future density based on the headway correction factor;
   generating, at the control server, a control signal for a connected automated vehicle (CAV) based on at least one of: the determined future flow, the determined future average velocity, or the determined future density; and
   transmitting the generated control signal to the CAV.

2. The method of claim 1, wherein the additional vehicles proximate to the CV comprise at least one of: a vehicle in front of the CV in a lane adjacent to the CV or a vehicle behind the CV in a lane adjacent to the CV.

3. The method of claim 1, wherein the control server receives the velocity data and the headway data from multiple CVs, including the CV, wherein the velocity correction factor is computed based on the velocity data from the multiple CVs, wherein the headway correction factor is computed based on the headway data from the multiple CVs.

4. The method of claim 1, wherein the prediction engine leverages a long-term shared world model storing data received from multiple CVs, including the CV, and multiple roadway sensors associated with at least one roadway used by the multiple CVs.

5. The method of claim 1, wherein adjusting the determined future flow based on the velocity correction factor and the headway correction factor comprises: multiplying the determined future flow by a quotient of the velocity correction factor and the headway correction factor.

6. The method of claim 1, wherein adjusting the determined future average velocity based on the velocity correction factor comprises: multiplying the determined future average velocity by the velocity correction factor.

7. The method of claim 1, wherein adjusting the determined future density based on the headway correction factor comprises: dividing the determined future density by the headway correction factor.

8. An apparatus comprising:
a memory storing instructions; and
a processor to execute the stored instructions to:
  receive, at a control server and from a connected vehicle (CV), velocity data representing velocities of the CV and additional vehicles proximate to the CV;
  compute a velocity correction factor based on the velocity data;
  receive, at the control server and from the CV, headway data representing a headway of the CV and the additional vehicles proximate to the CV;
  compute a headway correction factor based on the headway data;
  determine, using a prediction engine at the control server, a future flow, a future average velocity, and a future density for a segment of a roadway;
  adjust the determined future flow based on the velocity correction factor and the headway correction factor;
  adjust the determined future average velocity based on the velocity correction factor;
  adjust the determined future density based on the headway correction factor;
  generate, at the control server, a control signal for a connected automated vehicle (CAV) based on at least one of: the determined future flow, the determined future average velocity, or the determined future density; and
  transmit the generated control signal to the CAV.

9. The apparatus of claim 8, wherein the additional vehicles proximate to the CV comprise at least one of: a vehicle in front of the CV in a lane adjacent to the CV or a vehicle behind the CV in a lane adjacent to the CV.

10. The apparatus of claim 8, wherein the control server receives the velocity data and the headway data from multiple CVs, including the CV, wherein the velocity correction factor is computed based on the velocity data from the multiple CVs, wherein the headway correction factor is computed based on the headway data from the multiple CVs.

11. The apparatus of claim 8, wherein the prediction engine leverages a long-term shared world model storing data received from multiple CVs, including the CV, and multiple roadway sensors associated with at least one roadway used by the multiple CVs.

12. The apparatus of claim 8, wherein adjusting the determined future flow based on the velocity correction factor and the headway correction factor comprises: multiplying the determined future flow by a quotient of the velocity correction factor and the headway correction factor.

13. The apparatus of claim 8, wherein adjusting the determined future average velocity based on the velocity correction factor comprises: multiplying the determined future average velocity by the velocity correction factor.

14. The apparatus of claim 8, wherein adjusting the determined future density based on the headway correction factor comprises: dividing the determined future density by the headway correction factor.

15. A non-transitory computer-readable medium storing instructions which, when executed by a processor, cause the processor to perform operations comprising:
  receiving, at a control server and from a connected vehicle (CV), velocity data representing velocities of the CV and additional vehicles proximate to the CV;
  computing a velocity correction factor based on the velocity data;
  receiving, at the control server and from the CV, headway data representing a headway of the CV and the additional vehicles proximate to the CV;
  computing a headway correction factor based on the headway data;
  determining, using a prediction engine at the control server, a future flow, a future average velocity, and a future density for a segment of a roadway;
  adjusting the determined future flow based on the velocity correction factor and the headway correction factor;
  adjusting the determined future average velocity based on the velocity correction factor;
  adjusting the determined future density based on the headway correction factor;
  generating, at the control server, a control signal for a connected automated vehicle (CAV) based on at least one of: the determined future flow, the determined future average velocity, or the determined future density; and
  transmitting the generated control signal to the CAV.

16. The computer-readable medium of claim 15, wherein the additional vehicles proximate to the CV comprise at least one of: a vehicle in front of the CV in a lane adjacent to the CV or a vehicle behind the CV in a lane adjacent to the CV.

17. The computer-readable medium of claim 15, wherein the control server receives the velocity data and the headway data from multiple CVs, including the CV, wherein the velocity correction factor is computed based on the velocity data from the multiple CVs, wherein the headway correction factor is computed based on the headway data from the multiple CVs.

18. The computer-readable medium of claim 15, wherein the prediction engine leverages a long-term shared world model storing data received from multiple CVs, including the CV, and multiple roadway sensors associated with at least one roadway used by the multiple CVs.

19. The computer-readable medium of claim 15, wherein adjusting the determined future flow based on the velocity correction factor and the headway correction factor comprises: multiplying the determined future flow by a quotient of the velocity correction factor and the headway correction factor.

20. The computer-readable medium of claim 15, wherein adjusting the determined future average velocity based on the velocity correction factor comprises: multiplying the determined future average velocity by the velocity correction factor.

* * * * *